United States Patent [19]

Fond et al.

[11] Patent Number: 5,327,815
[45] Date of Patent: Jul. 12, 1994

[54] DEVICE FOR USE IN BEVERAGE EXTRACTION MACHINES

[75] Inventors: Olivier Fond, Yverdon; Alfred Yoakim, La Tour-de-Peilz, both of Switzerland

[73] Assignee: Nestec S.A., Vevey, Switzerland

[21] Appl. No.: 899,499

[22] Filed: Jun. 16, 1992

[30] Foreign Application Priority Data

Jul. 5, 1991 [EP] European Pat. Off. ........ 91111212.6

[51] Int. Cl.⁵ .............................................. A47J 31/24
[52] U.S. Cl. ................................... 99/295; 99/302 R
[58] Field of Search .................. 99/295, 300, 302 R, 99/307, 316

[56] References Cited

U.S. PATENT DOCUMENTS

| | | | |
|---|---|---|---|
| 726,793 | 4/1903 | Bezzera | 99/302 R |
| 1,493,984 | 5/1924 | Iglesias | 99/302 R |
| 1,750,068 | 3/1930 | Torriani | 99/302 R |
| 2,154,845 | 4/1939 | Hegwein | 99/302 R |
| 2,715,868 | 8/1955 | Brown | 99/302 R |
| 2,899,886 | 8/1959 | Rodth | 99/295 |
| 2,968,560 | 1/1961 | Goros | 99/295 |
| 3,030,874 | 4/1962 | Fiori | 99/302 R |
| 3,055,286 | 9/1962 | Valente | 99/302 R |
| 3,295,998 | 1/1967 | Goros | 99/282 |
| 3,349,690 | 10/1967 | Heier | 99/302 R |
| 3,403,617 | 10/1968 | Lampe | 99/295 |
| 3,607,297 | 9/1971 | Fasano . | |
| 4,429,623 | 2/1984 | Illy | 99/295 |
| 4,846,052 | 7/1989 | Faure et al. | 99/302 R |

FOREIGN PATENT DOCUMENTS

| | | | |
|---|---|---|---|
| 0070403 | 1/1983 | European Pat. Off. . | |
| 7430109 | 3/1976 | Fed. Rep. of Germany . | |
| 8908315 | 8/1989 | Fed. Rep. of Germany . | |
| 771447 | 10/1934 | France | 99/302 R |
| 1167814 | 12/1958 | France | 99/302 R |
| 1381849 | 11/1964 | France | 99/302 R |
| 1537031 | 6/1967 | France . | |
| 1566089 | 5/1969 | France . | |
| 2033190 | 8/1971 | France . | |
| 447690 | 4/1949 | Italy | 99/302 R |
| 533076 | 9/1955 | Italy | 99/302 R |

Primary Examiner—Timothy F. Simone
Assistant Examiner—Mark Spisich
Attorney, Agent, or Firm—Vogt & O'Donnell

[57] ABSTRACT

Devices for use in a water injection coffee extraction machine are in a form of a hollowed ring which may be fixed about the base of the extraction head of the coffee machine, and a grill or other member, which allows passage of extraction water therethrough, is positioned transversely within the interior of the ring so that upon fitting the ring about the extraction head base, the grill or other member is positioned adjacent the base of the extraction head. The grill may have projections which extend in a direction away from the extraction head, and the member may have a centrally disposed portion which has a form of a needle which also contains at least one hole.

10 Claims, 3 Drawing Sheets

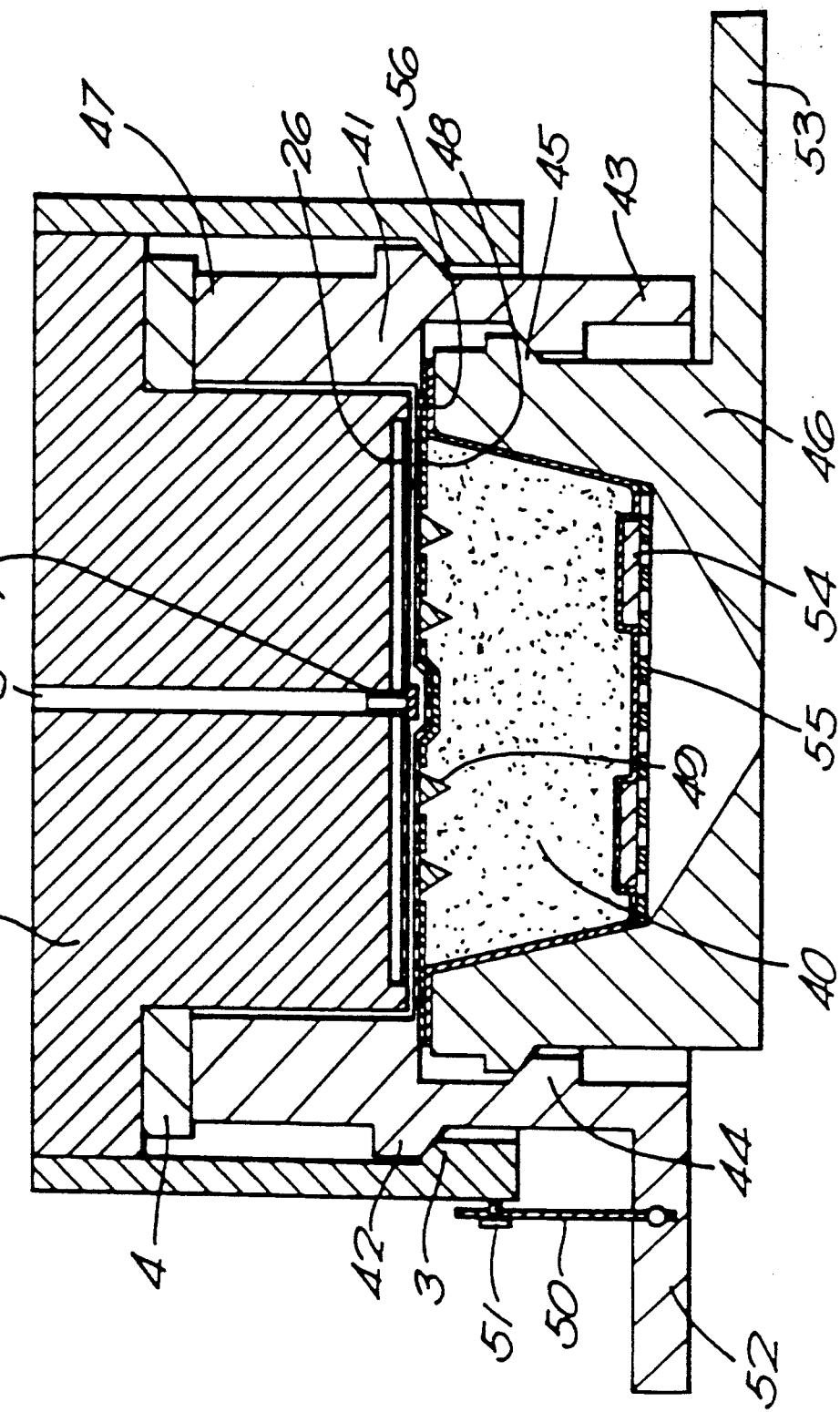

DEVICE FOR USE IN BEVERAGE EXTRACTION MACHINES

BACKGROUND OF THE INVENTION

This invention relates to devices for the extraction of cartridges containing a substance for the preparation of a beverage which are designed to be fitted to the extraction head of a conventional espresso machine.

Ordinarily, espresso type coffee machines are used to extract ground coffee which has been measured out and placed beforehand in a metal filter held in a receptacle.

The upper part of espresso type coffee machines consists of a spray nozzle for spraying the coffee, a tightening ring for fixing the receptacle and a rubber seal designed to ensure fluid tightness and good extraction by forcing the water to pass through the layer of coffee.

However, the use of this system is laborious and causes soiling and frustration because the quality of the beverage obtained does not always live up to expectations. This is because it is difficult to measure out the coffee correctly and to determine whether it has been properly ground.

The use of coffee capsules, for example those according to Swiss Patent No. 605 293, is a good alternative because handling is simplified, the quality of the coffee is better and constant and the risk of soiling is reduced. Nevertheless, the use of coffee capsules requires perfect compatibility between the capsule and the extraction system, essentially for reasons of fluid tightness and to force the water through the layer of coffee.

This compatibility may be embodied in the design of the machine although, in this case, the machine generally allows the use of capsules only.

European Patent No. 70 403 relates to an espresso machine with an adapter for the extraction of open cartridges made of filter paper which is fluid-tight in its medial part. However, this system is restricted to one type of capsule which is difficult to produce.

SUMMARY OF THE INVENTION

The present invention relates to devices adaptable semi-temporarily to the majority of espresso coffee machines for the extraction of cartridges and to a fixing means and to a secondary water injector described below.

More particularly, the present invention relates to devices for the extraction of cartridges containing a substance for the preparation of a beverage which are designed to be fitted to an extraction head comprising a primary water injection system, a primary tightening ring with tightening ramps coaxial with the water injection system and a seal surrounding, and raised in relation to, the water injection systems, the devices comprising secondary fixing means, a cartridge holder and a secondary water injector, the secondary fixing means comprising on the outside tightening lugs designed to engage the tightening ramps of the primary tightening ring, on the inside a secondary tightening ring having tightening ramps engaged by the fixing lugs of the cartridge holder and, on top, a circular ring bearing against the seal, the secondary fixing means and the cartridge holder between them forming a cavity intended to receive the cartridge to be extracted, this cavity being integrally defined by one or the other component and fluid-tightness being ensured either on the rim of the upper face or on the rim of the lower face of the cartridge.

The cartridge is filled with a substance for the preparation of a beverage. This substance is preferably ground and roasted coffee, but may also be tea, soluble coffee, a mixture of ground coffee and soluble coffee or a chocolate-flavoured product or a dehydrated soup.

DETAILED DESCRIPTION OF THE INVENTION

The cartridge used in the device according to the invention may be the cartridge according to the European Patent Application filed by applicants under No. 91107650. 3. It is also possible to use the capsules according to European Patent Applications Nos. 90114404.8 and 90114405. 5.

The cartridge used may also be selected from those according to the European Patent Applications filed under the titles "A rigid pack and a process for its production" (EP 91111213.4), "A flexible pack with a stiffening element and a process for its production" (EP 91111214.2) and "An open flexible pack and a process for its production" (EP 91111209.2). It has a diameter of preferably between 2.5 and 6 cm and a coffee layer thickness between 10 and 25 mm.

The primary water injection system is always formed by a water distributing grill held by a hollow screw.

If the cartridge is open before extraction, the secondary water injection system is simply formed by a grill or a single opening in the zone co-operating with the upper face of the cartridge to allow the water to pass from the water distributing grill of the machine into the cartridge. Similarly, the lower part of the cartridge holder has a single flow grill which co-operates with the lower face of the cartridge.

Although reference is made to closed cartridges, of which the quality resides in the fact that they open automatically on extraction, considerably simplifying the manipulations and ensuring ultimate quality by protecting the coffee against oxygen until the last moment before extraction, it is important to mention the device which is responsible for this opening. This opening has to be twofold, namely, on the upper face to allow water to be introduced and on the lower face to allow removal of the extracted coffee.

The first solution comprises providing a primary water injection system in the form of a water distributing grill held by any known means, such as a screw, and a secondary water injector in the form of a water distributing grill with projecting elements coaxial with the screw or a single opening with projecting elements arranged on radial or transverse pins.

These projecting elements may be vertical or slightly angled to increase the size of the tears made in the cartridges. The water enters the cartridge without difficulty because, under the effect of the water pressure, the flexible upper membrane is able to flex slightly and thus to release the openings formed by the projecting elements.

These projecting elements are formed, for example, by frustoconical points between 2 and 7 mm in height with an average diameter of 2 to 5 mm or by small foils or crosses between 2 and 7 mm in height and between 1 and 3 mm in thickness cut slightly in a crest.

These elements, which are preferably between 3 and 10 in number, are distributed over the lower face of the grill in the zone corresponding to the upper internal diameter of the body of the cartridge.

The second solution comprises providing the primary water injection system in the form of a water distributing grill held by any known means, such as a screw, and a secondary water injector in the form of a water injection needle coaxial with the primary and secondary retaining collars. This needle performs the dual function of perforating the upper face of the cartridge and injecting water. This water injection system may be, for example, the system forming part of the subject matter of European Patent Application No. 90114402 filed 27th Jul. 1990.

The lower face may be opened by the method and part of the device according to European Patent Application No. 91107462.3. This is because the device consisting of relief and recessed elements arranged on the flow grill of the cartridge holder has to be adapted. The lower face may also be opened with the devices according to European Patent Applications Nos. 90114401.4 and 90114403.0, i.e., with a cartridge holder comprising a central finger on its lower part, optionally with radial fins.

The upper circular ring and secondary fixing means are of such dimensions that they can be retained against the seal of the extraction head without any interference from the water distributing grill or the extraction head of the machine, but without leaving too much free space between itself and the extraction head, this space being filled with water during each extraction cycle and being able to expand during release of the device after extraction of the cartridge.

Depending on whether the cartridge is frustoconical, hemispherical or an inverted frustum, the internal forms of the cartridge holder and the secondary fixing means will be variable for each although the association of the two components will always represent an inner recess adapted to the cartridge.

If the cartridge is an inverted frustum, the cartridge holder will comprise a recess adapted in shape to the external form of the cartridge to be extracted, the upper edge of the cartridge holder bearing against the secondary fixing means on the periphery of the secondary water injector. Fluid tightness is established by compression of the upper periphery of the cartridge between the upper rim of the cartridge holder and the secondary fixing means which may comprise a flexible seal in the zone corresponding to the rim of the cartridge.

If the cartridge is frustoconical or hemispherical, the secondary fixing means will be extended in the form of a hollow annular element to create a recess of which the shape follows the external form of the cartridge to be extracted, the lower periphery of this element bearing against the peripheral border of the base of the recess of the cartridge holder. Fluid tightness during extraction is established at the lower rim of the cartridge which is compressed between the lower part of the hollow annular element and the periphery of the base of the recess of the cartridge holder.

The secondary fixing means has to be locked in the machine after temporary positioning to ensure that it does not come loose each time the cartridge holder itself is released after extraction of the cartridge. This may be obtained by means of a lug provided with a locking screw mounted on the handle of the secondary fixing means.

The invention is described in more detail with reference to the accompanying drawings.

BRIEF DESCRIPTION OF THE DRAWINGS

FIG. 3 is a section through the device according to the invention for the extraction of inverted frustum cartridges.

DETAILED DESCRIPTION OF THE DRAWINGS

Figure 1:
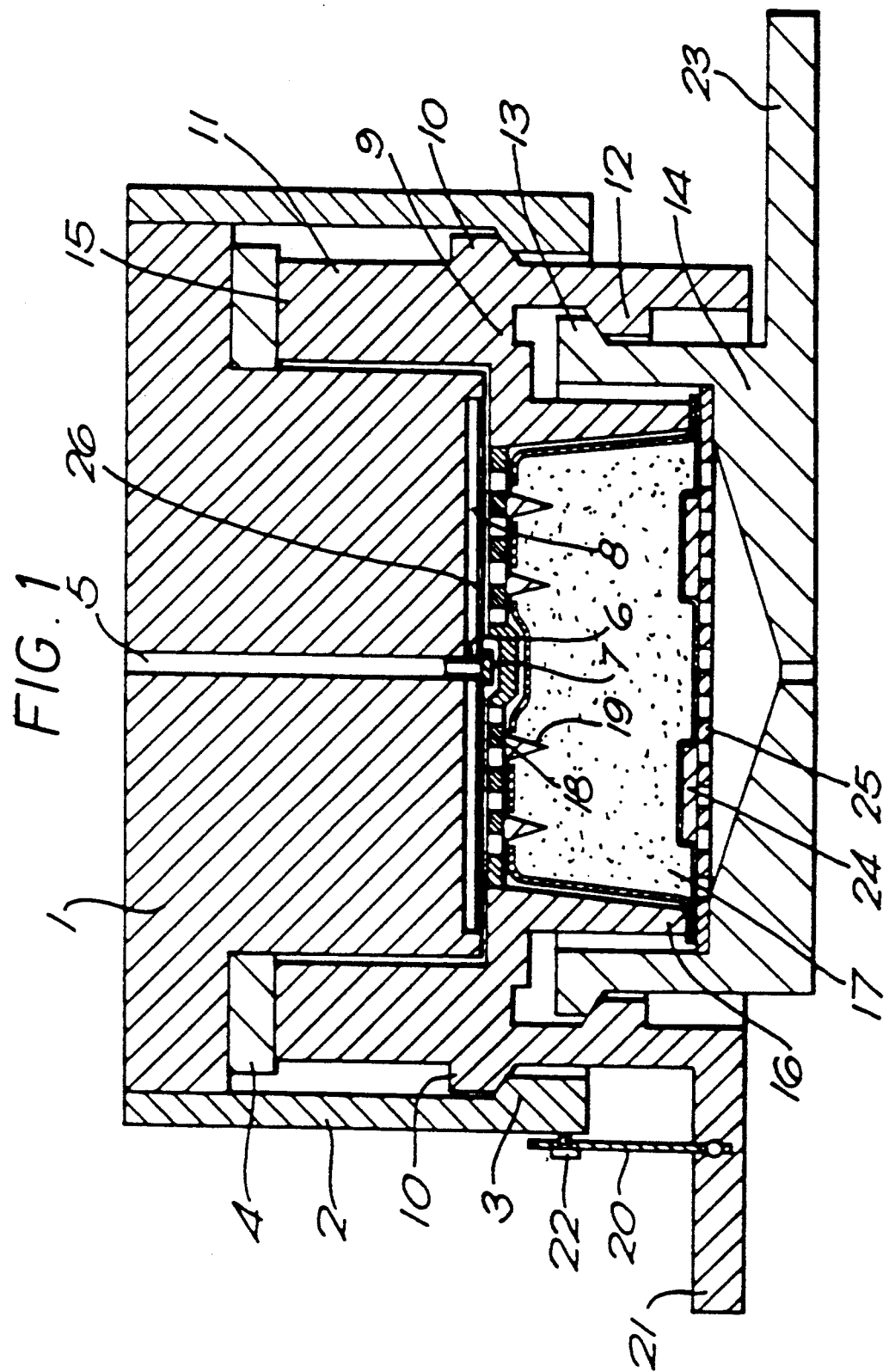
FIG. 1 is a section through the device according to the invention for the extraction of frustoconical cartridges.

FIG. 1 shows a conventional extraction head (1) of an espresso type coffee machine. It comprises a tightening ring (2) with tightening ramps (3). The seal (4) establishes fluid tightness during the extraction process. The water arrives through the passage (5) and passes through the orifices (6) of the hollow screw (7) for distribution in the chamber (8).

A device according to the invention comprises secondary fixing means (9) comprising tightening lugs (10) designed to engage the retaining ramps (3), a secondary tightening ring (11) with tightening ramps (12) engaged by the tightening lugs (13) of the cartridge holder (14) and, at its top, a circular ring (15) which bears against the seal (4). Finally, the fixing means (9) comprises a hollow annular element (16) which defines a recess for the cartridge (17) to be extracted and, above the cartridge, a water distributing grill (18) with projecting elements (19).

The fixing means (9) is prevented from turning by a lug (20) provided with a locking screw (22) mounted on the handle (21) of the fixing means. The cartridge holder (14) comprises a handle (23), projecting elements (24) and a flow grill (25), the lower face of the cartridge resting on the projecting elements (24).

In operation, the cartridge (17) is placed in the cartridge holder (14) which is engaged on the tightening ramps (12). The projecting elements (19) pierce the top of the cartridge. When the machine is brought into operation, the water arrives through the passage (5) and is uniformly distributed over the grill (26) through which it then passes to enter the cartridge through the openings formed by the projecting elements (19). There is an increase in pressure in the cartridge and the lower face of the cartridge bears against the projecting elements (24) until it reaches its breaking stress. The coffee then flows through the grill (25) and is collected in a container (not shown). Fluid tightness is guaranteed by compression of the circumference of the lower part of the cartridge between the edge of the hollow annular element (16) and the periphery of the base of the recess of the cartridge holder (14).

Figure 2:
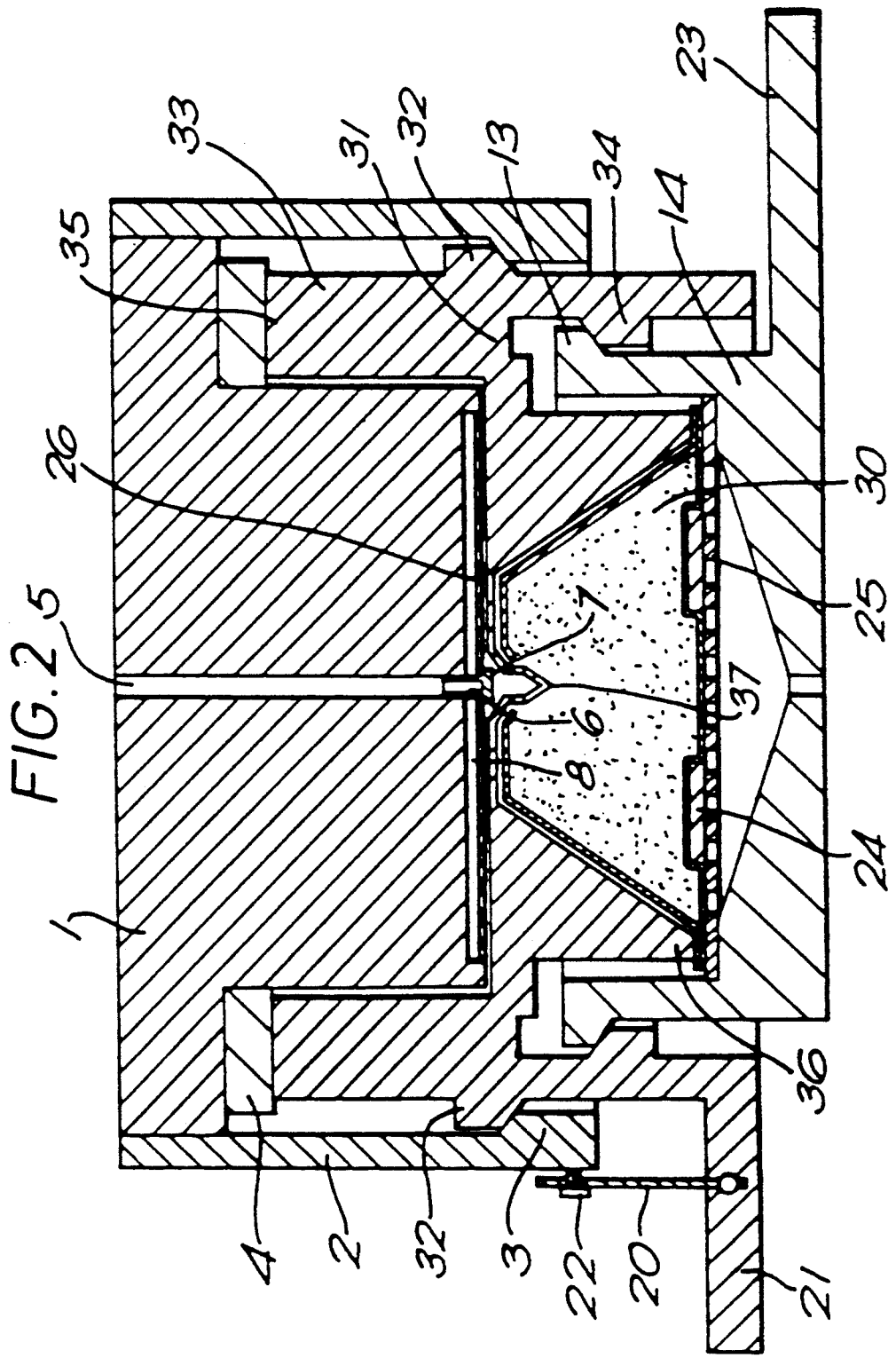
FIG. 2 is a section through a second embodiment of the device according to the invention for the extraction of frustoconical cartridges.

In FIG. 2, the same elements as in FIG. 1 are denoted by the same reference numerals. The cartridge (30) to be extracted is different. The extraction head (1) is identical with that shown in FIG. 1, as is the cartridge holder (14). The secondary fixing means comprises tightening lugs (32) designed to engage the tightening ramps (3), a secondary tightening ring (33) with tightening ramps (34) engaged by the fixing lugs (13) of the cartridge holder (14) and, at its top, a circular ring (35) which bears against the seal (4). Finally, the fixing means (31) comprises a hollow annular element defining a recess for the cartridge (30) to be extracted. The basic difference in relation to FIG. 1 lies in the presence of the water injection needle (37) for the injection of water. This needle pierces the top of the cartridge and the water arrives through orifices formed in the needle to enter the cartridge (30) to be extracted. The mode of operation of the device is otherwise the same as that of the device shown in FIG. 1.

The device shown in FIG. 3 is designed for the extraction of cartridges in the form of inverted frustums. The same elements as in FIG. 1 have been denoted by the same reference numerals. The extraction head (1) is the same as shown in FIGS. 1 and 2. The secondary fixing means (41) comprises tightening lugs (42) designed to engage the tightening ramps (3), a secondary tightening ring (43) with tightening ramps (44) engaged by the fixing lugs (45) of the cartridge holder (46) and, at its top, a circular ring (47) bearing against the seal (4). Finally, this fixing means comprises a second water distributing grill (48) with projecting elements (49) beneath the water distributing grill (26) of the extraction head. The fixing means (41) is prevented from turning by a lug (50) provided with a locking screw (51) mounted on the handle (52) of the fixing means. The cartridge holder (46) comprises a handle (53), projecting elements (54) and a flow grill (55), the lower face of the cartridge resting on the projecting elements (54).

For extraction, the fluid tightness of the system as shown in FIG. 3 is established on the periphery of the upper edge of the cartridge (40) to be extracted by means of a seal (56) integral with the fixing means (41). The mode of operation of the device is the same as that of the device shown in FIG. 1.

We claim:

1. A fixing ring device for use with a water injection coffee extraction apparatus of the type having an extraction head and a tightening ring disposed about the extraction head, wherein the extraction head has a base, a water injection system opening in the base, a peripheral portion which extends longitudinally from the base, a surface portion which extends laterally from the peripheral portion, and a seal positioned adjacent the surface portion and wherein the tightening ring is fitted to the head and has a portion which extends coaxially about and which is displaced away from the head peripheral portion to form a gap which extends between the head peripheral portion and the tightening ring in which the seal is disposed and wherein the tightening ring has ramps which extend into the gap, the fixing ring device comprising:

an annular member in a shape of a ring and having a grill intermediately disposed therein which defines and separates first and second interior portions of the annular member, wherein the annular member has a first interior surface portion which surrounds the first interior portion and which is adapted to be fitted about the peripheral portion of the extraction head and for extending into the gap and to an edge for fitting adjacent the seal and wherein the grill has two opposing surfaces which extend laterally with respect to the first interior surface portion and are connected with the first interior surface portion at a position so that upon the annular member being fitted to the head, the grill has a first surface which is fitted adjacent the extraction head base;

a plurality of projection elements for piercing a cartridge containing a beverage preparation substance and which are positioned to extend from a second surface of the grill which opposes the first surface in a direction away from the first interior portion;

an annular member outer surface having lugs which extend therefrom for engaging the ramps of the tightening ring to fix the annular member to the extraction head and tightening ring so that upon being fixed, the edge of the annular member is fitted adjacent the seal and so that the first surface of the grill is positioned adjacent the extraction head base; and an annular member inner surface portion which surrounds the second interior portion having ramps which extend therefrom for supporting a cartridge holder for, in turn, supporting a cartridge containing a beverage preparation substance for being pierced by the projection elements and for extracting the beverage preparation substance.

2. A device according to claim 1 wherein the annular member comprises a further annular portion which extends laterally from a position about the grill in a direction away from the grill into the second interior portion and which has an inner surface which forms a cavity adjacent the grill for surrounding a cartridge positioned adjacent the grill and which has an outer surface which is displaced away by a gap from the inner surface which defines the second interior portion.

3. A fixing ring device for use with a water injection coffee extraction apparatus of the type having an extraction head and a tightening ring disposed about the extraction head, wherein the extraction head has a base, a water injection system opening in the base, a peripheral portion which extends longitudinally from the base, a surface portion which extends laterally from the peripheral portion, and a seal positioned adjacent the surface portion and wherein the tightening ring is fitted to the head and has a portion which extends coaxially about and which is displaced away from the head peripheral portion to form a gap between the head peripheral portion and the tightening ring in which the seal is disposed and wherein the tightening ring has ramps which extend into the gap, the fixing ring device comprising:

an annular member is a shape of a ring and having a wall portion intermediately disposed therein which defines and separates first and second interior portions of the annular member, wherein the annular member has a first interior surface portion which surrounds the first interior portion and which is adapted to be fitted about the peripheral portion of the extraction head and for extending into the gap and to an edge for fitting adjacent and seal and wherein the wall portion has two opposing surfaces which extend laterally with respect to the first interior surface portion and a centrally disposed projecting portion which contains at least one hole for distributing water from the water injection system opening and is connected with the first interior surface portion at a position so that upon the annular member being fitted to the head, the wall portion has a first surface which is fitted adjacent the extraction head base and the projecting portion projects in a direction away from the first interior portion for piercing a cartridge containing a beverage preparation substance;

an annular member outer surface having lugs which extend therefrom for engaging the ramps of the tightening ring to fix the annular member to the extraction head and tightening ring so that upon being fixed, the edge of the annular member is fitted adjacent the seal and so that the first surface of the wall portion is positioned adjacent the extraction head base; and an annular member inner surface portion which surrounds the second interior portion having ramps which extend therefrom for supporting a cartridge holder for, in turn, supporting a cartridge containing a beverage preparation substance for being pierced by the projecting portion and for extracting the beverage preparation substance.

4. A device according to claim 3 wherein the annular member comprises a further annular portion which extends laterally from a position about the wall portion in a direction away from the wall portion into the second interior portion and which has an inner surface which forms a cavity adjacent the wall portion for surrounding a cartridge positioned adjacent the wall portion and which has an outer surface which is displaced away by a gap from the inner surface which defines the second interior portion.

5. An apparatus for extracting a substance contained in a cartridge for preparation of a beverage comprising:
an extraction head having a base, a water injection system opening in the base, a peripheral portion which extends longitudinally from the base and a surface portion which extends laterally from the peripheral portion;
a seal positioned adjacent the head surface portion;
a tightening ring fitted to the head which has a portion which extends coaxially about and which is displaced away from the head peripheral portion to form a gap which extends between the head peripheral portion and the tightening ring in which is disposed and which has ramps which extend into the gap;
a fixing ring device having:
an annular member in a shape of a ring and having a grill intermediately disposed therein which defines and separates first and second interior portions of the annular member, wherein the annular member has a first interior surface portion which surrounds the first interior portion and which is adapted to be fitted about the peripheral portion of the extraction head and for extending into the gap and to an edge for fitting adjacent the seal and wherein the grill has two opposing surfaces which extend laterally with respect to the first interior surface portion and are connected with the first interior surface portion at a position so that upon the annular member being fitted to the head, the grill has a first surface fitted adjacent the extraction head base;
a plurality of projection elements for piercing a cartridge containing a beverage preparation substance and which are positioned to extend from a second surface of the grill which opposes the first surface in a direction away from the first interior portion;
an annular member outer surface having lugs which extend therefrom for engaging the ramps of the tightening ring to fix the annular member to the extraction head and tightening ring so that upon being fixed, the edge of the annular member is fitted adjacent the seal and so that the first surface of the grill is positioned adjacent the extraction head base;
an annular member inner surface portion which surrounds the second interior portion having ramps which extend therefrom; and a cartridge holder having a hollowed annular interior for supporting a cartridge containing a beverage preparation substance to be extracted and having a peripheral outer portion having lugs extending therefrom positioned for engaging the annular member ramps for supporting the holder and placing the cartridge adjacent the grill for being pierced by the projection elements and for extracting the beverage preparation substance.

6. An apparatus according to claim 5 wherein the annular member comprises a further annular portion which extends laterally from a position about the grill in a direction away from the grill into the second interior portion and which has an inner surface which forms a cavity adjacent the grill for surrounding a cartridge positioned adjacent the grill and which has an outer surface which is displaced away by a gap from the inner surface which defines the second interior portion.

7. An apparatus according to claim 5 wherein the extraction head base further comprises a head base grill for distributing water from the head base opening and wherein the annular member grill is fitted adjacent the head base grill so that the head base grill is positioned between the annular member grill and head base opening.

8. An apparatus for extracting a substance contained in a cartridge for preparation of a beverage comprising:
an extraction head having a base, a water injection system opening in the base, a peripheral portion which extends longitudinally from the base and a surface portion which extends laterally from the peripheral portion;
a seal positioned adjacent the head surface portion;
a tightening ring fitted to the head which has a portion which extends coaxially about and which is displaced away from the head peripheral portion to form a gap which extends between the head peripheral portion and the tightening ring in which the seal is disposed and which has ramps which extend into the gap;
a fixing ring device having:
an annular member in a shape of a ring and having a wall portion intermediately disposed therein which defines and separates first and second interior portions of the annular member, wherein the annular member has a first interior surface portion which surrounds the first interior portion and which is adapted to be fitted about the peripheral portion of the extraction head and for extending to an edge in the gap for fitting adjacent the seal and wherein the wall portion has two opposing surfaces which extend laterally with respect to the first interior surface portion and a centrally disposed projecting portion which contains at least one hole for distributing water and is connected with the first interior surface portion at a position so that upon the annular member being fitted to the head, the wall portion has a first surface which is fitted adjacent the extraction head base and the projecting portion projects in a direction away from the first interior portion for piercing a cartridge containing a beverage preparation substance;
an annular member outer surface having lugs which extend therefrom for engaging the ramps of the tightening ring to fix the annular member to the extraction head and tightening ring so that upon being fixed, the edge of the annular member is fitted adjacent the seal and so that the first surface of the wall portion is positioned adjacent the extraction head base;

an annular member inner surface portion which surrounds the second interior portion having ramps which extend therefrom; and a cartridge holder having a hollowed annular interior for supporting a cartridge containing a beverage preparation substance to be extracted and having a peripheral outer portion having lugs extending therefrom positioned for engaging the annular member ramps for supporting the holder and placing the cartridge adjacent the wall portion for being pierced by the projecting portion and for extracting the beverage preparation substance.

9. An apparatus according to claim 8 wherein the annular member comprises a further annular portion which extends laterally from a position about the wall portion in a direction away from the wall portion into the second interior portion and which has an inner surface which forms a cavity adjacent the wall portion for surrounding a cartridge positioned adjacent the wall portion and which has an outer surface which is displaced away by a gap from the inner surface which defines the second interior portion.

10. An apparatus according to claim 8 wherein the extraction head base further comprises a head base grill for distributing water from the head base opening and wherein the annular member wall portion is fitted adjacent the head base grill so that the head base grill is positioned between the annular member wall portion and the head base opening.

* * * * *

UNITED STATES PATENT AND TRADEMARK OFFICE
CERTIFICATE OF CORRECTION

PATENT NO. : 5,327,815

DATED : July 12, 1994

INVENTOR(S) : Olivier Fond, et al

It is certified that error appears in the above-indentified patent and that said Letters Patent is hereby corrected as shown below:

Column 6, line 41 claim 3, "is" should be —in—.
Column 6, line 49 claim 3, "and" (second occurrence) should be —the—.
Column 7, line 32 claim 5, after "which" insert —the seal—.

Signed and Sealed this

Fourth Day of October, 1994

Attest:

BRUCE LEHMAN

Attesting Officer          Commissioner of Patents and Trademarks